US007127998B2

(12) United States Patent
MacDonald et al.

(10) Patent No.: US 7,127,998 B2
(45) Date of Patent: Oct. 31, 2006

(54) OBJECT MOVEMENT SYSTEM AND METHOD

(75) Inventors: S. Alexander MacDonald, Porter Ranch, CA (US); Jim Rodnunsky, Granada Hills, CA (US)

(73) Assignee: Cablecam, LLC, Tulsa, OK (US)

( * ) Notice: Subject to any disclaimer, the term of this patent is extended or adjusted under 35 U.S.C. 154(b) by 55 days.

(21) Appl. No.: 10/906,621

(22) Filed: Feb. 27, 2005

(65) Prior Publication Data

US 2005/0160936 A1 Jul. 28, 2005

Related U.S. Application Data

(63) Continuation-in-part of application No. 10/709,918, filed on Jun. 4, 2004, now Pat. No. 7,036,436, which is a continuation-in-part of application No. 10/605,778, filed on Oct. 25, 2003.

(51) Int. Cl.
*B61B 7/00* (2006.01)

(52) U.S. Cl. .................. 104/178; 104/180; 212/76; 212/98

(58) Field of Classification Search ............. 104/173.1, 104/112, 115, 116, 117, 180; 212/76, 77, 212/81, 82, 83, 84, 85, 98, 313, 197; 396/12; 318/649

See application file for complete search history.

(56) References Cited

U.S. PATENT DOCUMENTS 942,038 A * 11/1909 Miller .......................... 212/81
1,086,912 A * 2/1914 Hadsel ........................ 212/84
1,247,309 A * 11/1917 Miller ......................... 212/81
1,729,964 A * 10/1929 Peugh ........................ 212/313
2,035,107 A * 3/1936 Voss ............................ 212/87
RE27,621 E * 4/1973 McIntyre ..................... 212/84
4,136,786 A * 1/1979 Morrow ...................... 212/76

* cited by examiner

*Primary Examiner*—Mark T. Le
(74) *Attorney, Agent, or Firm*—Dalina Law Group P.C.

(57) ABSTRACT

Embodiments of the invention move objects throughout two-dimensional and three-dimensional space by using a movement line that is coupled with a plurality of opposing sides of the platform. The movement line is used to control the horizontal axis motion and Z-axis motion of the platform and is designated the horizontal movement line. Displacing a portion of the horizontal movement line allows vertical displacement of the platform to be traversed. There is no need for a complex computer control system since the Z-axis displacement is substantially independent of horizontal movement over a coverage area serviced by the platform. Nested embodiments utilizing one or more rope allow for three-dimensional movement of an object or angular displacement of an object with respect to the vertical axis. A mounting beam for positioning and supporting the Z-axis and horizontal axis motors and visual display element(s) and other optional multimedia devices may also be positioned independently of the platform. In addition, since the line may be commanded from one point, distantly located motors and electrical cables are not required. Many types of useful devices may then be attached to the platform including devices that require external power or devices that possess their own power and are operated via wireless signals.

6 Claims, 20 Drawing Sheets

OBJECT MOVEMENT SYSTEM AND METHOD

DESCRIPTION

This application is a continuation in part of U.S. patent application Ser. No. 10/605,778, filed Oct. 25, 2003 entitled "System and Method for Moving Objects within Two-Dimensional Space" the specification of which is hereby incorporated herein by reference. This application is a continuation in part of U.S. patent application Ser. No. 10/709,918, filed Jun. 4, 2004 now U.S. Pat. No. 7,036,436, entitled "A Mounting System Reeved to Move an Object in 2-D and Methods Relating to Same" the specification of which is hereby incorporated herein by reference. U.S. patent application Ser. No. 10/709,944, filed Jun. 8, 2004 now U.S. Pat. No. 6,975,089 entitled "System and Method for Facilitating Fluid Three-Dimensional Movement of an Object Via Directional Force" the specification of which is hereby incorporated herein by reference.

BACKGROUND OF THE INVENTION

1. Field of the Invention

Embodiments of the invention described herein pertain to the field of aerial cable rail systems. More particularly, these embodiments enable the movement of objects within two-dimensional and three-dimensional space.

2. Description of the Related Art

An aerial cable rail system is a system based on an elevated cable or line, along which objects are transported. Existing cable rail systems have relied on large fixed structures and/or complex control systems in order to facilitate the movement of objects. These systems fail to satisfactorily achieve the full spectrum of ease of control, compact storage, ease of transport, speed, load bearing, extensibility, maintainability and platform stability.

Any number of coordinate systems can be used in order to describe the path of an object as it moves through space. This document uses the terms Z-axis and Y-axis to denote vertical and horizontal directions respectively.

In U.S. Pat. No. 6,199,829 a device is described that follows a line. There is no mechanism for altering the Z-axis displacement of the mechanism moving along the line. The device is self propelled and is heavy.

In U.S. Pat. No. 5,113,768 a device for transporting a camera along a cable is described. The device must be secure enough to carry not only a camera but also a human photographer. The device is limited in the amount of Z-axis displacement that can be effected.

In U.S. Pat. No. 4,864,937 a point A to point B cable rail is described. The device possesses no means to descend in the Z-axis other than by placement of poles. The poles supporting the structure are placed at fixed heights in order to avoid objects on the ground.

In U.S. Pat. No. 6,145,679 a device is described that uses balloons to provide support for a highline. Items are transported along the highline. The balloons may be raised or lowered but are cumbersome in enclosed environments and stadiums where they would block the view of spectators. In addition, the speed at which items could be transported would be fairly slow since a balloon would have a large surface area and would not be capable of rapid horizontal movement.

In French Patent No. 992,069 a device is described which has no means for controlling the arc of travel of the supported object since all control is manual. In addition, no means for conveying messages or advertisements are contemplated and it appears that the device is intended for industrial operations where the stability of the supported object is of little concern.

BRIEF SUMMARY OF THE INVENTION

One or more embodiments of the invention are directed to a mounting system configured to move objects throughout two-dimensional and three-dimensional space by using at least one line (e.g., rope, cable or other mechanism) that is optionally reeved about a mounting beam and coupled with both opposing sides of a platform either rotationally or fixedly and wherein the platform may comprise the object to be moved. One line, which may be coupled with the optional mounting beam, controls both the Y-axis motion and Z-axis motion of the platform and is designated the YZ movement line. A nested embodiment of the invention may comprise a second line or a portion of the first line that is mounted parallel or non-parallel with the first line as seen from above and may comprise an XZ movement line, or a second YZ movement line or any other axial combination with the Z axis. A buoyant embodiment may be configured by coupling the platform with a buoyant device (balloon for aerial based embodiments, or float for aquatic based embodiments, or ferromagnetic material for space based embodiments). Buoyant or non-buoyant embodiments may be nested with buoyant or non-buoyant embodiments in any combination or number.

In a single line embodiment configured to move an object for example along the Y axis and vertically in the Z axis for example, displacing a portion of the YZ movement line via the Z-axis motor allows traversal of the Z-axis of the platform. Readers should note however that the actual path of traversal may curve be curved as will be explained further in the Detailed Description. Moving YZ movement line through the sheaves of the system via the Y-axis motor allows for traversal of the Y-axis of the platform (although like the Z-axis, the path of traversal may actually curve). Although computer control may be utilized, there is no need for a complex computer control system since over a coverage area serviced by the platform the Z-axis displacement is substantially independent of Y-axis movement and Y-axis displacement is substantially independent of Z-axis movement. This means that moving an object away from a given support structure can be accomplished by simply rotating the Y-axis motor although the object may minimally vertically displace in the middle of the path between the support structures to a lesser or greater extent depending upon the amount of line injected into the system via the Z movement device. This makes for trivial control when the amount of line in the system is set to follow the path of a stadium for example since the object may be configured to rise and follow the contour of the stadium without operator intervention (e.g., when the object is near each support structure). Vertical motion of the object is along the Z-axis when the amount of line to the object is the same from each support structure (i.e., when the object is in the middle of the coverage area) and slightly curved when near the support structures. Since the vertical component of motion is typically used in the middle and typically deepest part of the coverage area, no horizontal adjustments are typically necessary for this type of vertical motion. In other words, the Z-axis elements in the system control the upward and downward motion of the object although there may be some minimal but predictable horizontal motion, and the Y-axis elements in the system control the motion of the object between support structures although the object may experience some minimal but predictable vertical displacement during this movement.

In addition to trivial control and since it is possible to command the line from one point, distantly located motors and electrical cables are not required. Many types of useful objects may be attached to a mounting platform including devices that require external power or devices that possess their own power and are operated via wireless signals. By moving the platform, the object is therefore moved. The terms platform and object as used throughout this document are generally interchangeable. The term line as used herein is meant to include cables or any other suitable element for object suspension.

To ensure the platform follows a linear path in the Y direction without Z axis deviation, one or more embodiments of the invention contemplate the use of a computer control system. The control system takes into account the displacement of the platform from the support ends and adjusts the Z axis displacement during Y axis traversal. This allows the platform to travel in a straight line through three-dimensional space which may be important when using embodiments of the invention in locations that do not allow for an arced path.

Creating a two axis movement configuration from only one line driven from a point distantly located from the platform provides the advantages of allowing the motors to be large, power cables to be short and located near a large generator and optional control computer. Maintenance is readily performed in one location. The Z movement device in the system may also utilize a pulley arrangement that multiplies the Z-axis travel or may be constructed from levers, fulcrums, hydraulic or electronic actuators or any other device which can displace line.

It is feasible to configure the system to move objects along the Y and Z axes by using motors mounted at one support point, on or near the ground, to drive the lines. Embodiments of the invention use motors that connect to a generator, while other embodiments used in areas where power is readily available may use standard utility power. Generators used in embodiments of the invention can be as large as the application requires for achieving the required platform speed. The sheaves employed in the system may contain high speed bearings and are may be configured to capture the line in order to prevent derailing in order to add a degree of safety to the system. The drive pulleys attached to the motors comprise grooves that grip the line in order to prevent slippage. Any known means of driving line may be substituted for grooved pulleys.

For the purposes of this disclosure the use of the word motor signifies a motor connected to a drive pulley or drum winch. This assumption is made for purposes of illustration since it is well known in the art that the motor must drive any of a number of attachments to actually engage and move line. The system can be scaled to any size by employing longer lines and moving the attachment points or support structures.

Embodiments of the invention may be nested in order to support and move multiple independent or dependent objects. Dependent objects may for example comprise a pole coupled with a plurality of reevings that may keep a pole aligned vertically or may be moved independently in order to angle the pole with respect to any axis. Rigid couplings with a fixed distance between a plurality of reevings coupled to the pole may be utilized or non-rigid dependent couplings may also be utilized including telescoping poles or elastic bands for example. A plurality of lines irrespective of reeving may be coupled with a pole in order to provide a platform for a microphone for example. By offsetting the nested reevings about the vertical axis, for example orthogonally view respect to a viewpoint above the nested reevings, it is possible to move an object in the Y or X axes using coordinated control between each nested embodiment. In this manner, three-dimensional movement may be accomplished.

Independent objects may moved independent of one another and may also for example be controlled by one computer in order to avoid collisions between the independent objects. Collision sensors may be coupled with any element in the system in order to provide for collision avoidance with another object suspended and moved by another reeving instance, or with a stationary or moving object not associated with an embodiment of an invention as long as the position of the object is known to the system. Acoustic, optical or radar sensors, i.e., collision sensors, may be coupled anywhere within the system in order to reposition the supported object and/or line(s) in order to avoid a collision with a soccer ball, baseball, football or other sporting implement such as a javelin, hammer, shot put, or any other object that is capable of being detected. In pre-planned movements involving simulation, collision detection may be utilized in order to avoid a collision with an object that is sensed during actual movement of the physical embodiment followed by either exiting the pre-planned flight path or returning to the pre-planned flight path after avoidance.

DETAILED DESCRIPTION OF THE INVENTION

Embodiments of the invention are directed to a Mounting System Reeved to Move an Object in Two-Dimensions and Methods Relating to Same. In the following description numerous specific details are set forth in order to provide a more thorough understanding of embodiments of the invention. It will be apparent, however, to an artisan of ordinary skill that the present invention may be practiced without incorporating all aspects of the specific details described herein. Any mathematical references made herein are approximations that can in some instances be varied to any degree that enables the invention to accomplish the function for which it is designed. In other instances, specific features, quantities, or measurements well-known to those of ordinary skill in the art have not been described in detail so as not to obscure the invention. Readers should note that although examples of the invention are set forth herein, the claims, and the full scope of any equivalents, are what define the metes and bounds of the invention.

The term line as used herein is also meant to refer to a cable or other flexible element that can be adapted for use as described herein. Moreover the use of the term path as related to Y-axis or Z-axis movement should not be limited to a linear path but may include a curved path. For example, elements of the system described as Z-axis or Y-axis related have as their primary control motion associated with their respective axis, although with curved paths, e.g., the Z movement device may actually introduce some Y-axis motion into the moved object and visa versa. Therefore although the terms Z-axis movement and Y-axis movement refer to moving an object primarily in the respective Z-axis and Y-axis, in reality the paths through space may be curved depending on where in the system the moved object is and under what type of movement it is undergoing. For example the Z-path of motion of the platform may be nearly identical to the direction of the Z-axis when the platform is equidistant between the two support structures. The path of the platform when asserting the Z movement device is slightly curved when the platform is near one of the support structures. The path between support structures may be very nearly linear when the amount of line in the system is set to provide the object with the highest possible height.

Figure 2:
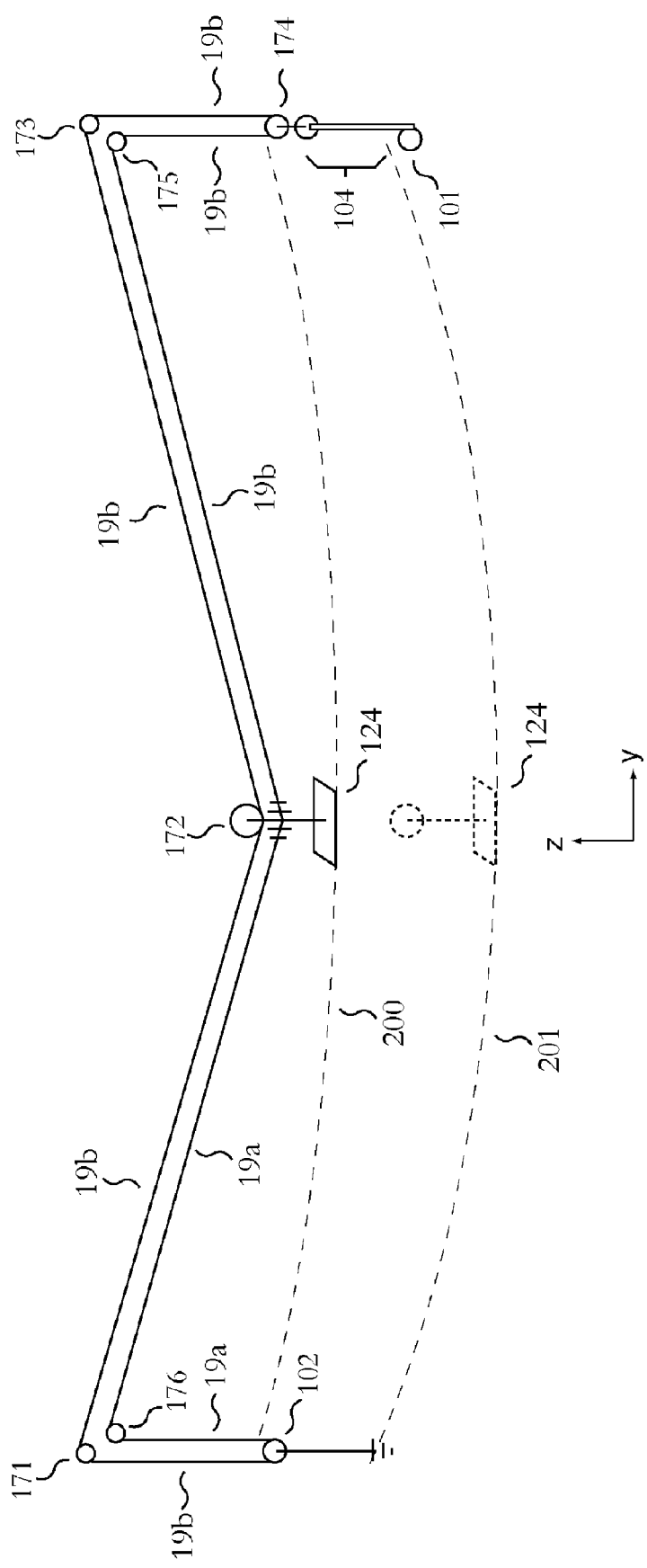
FIG. 2 is a YZ-axis reeving diagram for an embodiment of the invention employing distantly located winches for Y and Z-axis movement and shows two horizontal paths of motion depending on the height of the platform.

Any number of coordinate systems can be used in order to describe the path of an object as it moves through space. This document uses the terms Z-axis and Y-axis to denote vertical and horizontal directions respectively. The upward and downward path of an object moved by embodiments of the invention is not required to follow the exact vertical Z-axis and the path between support structures of an object may or may not follow the exact horizontal Y-axis as the object is moved when the amount of line in the system is kept constant. In general, on a first order approximation, for a given amount of line injected into the system, the path between support structures of an object being moved by embodiments of the invention is that portion of an ellipse lying beneath and between the support structures. With more line in the system, the path between support structures followed by an object becomes more circular or dipped in the middle. FIG. 2 shows this characteristic of the system. When the amount of line in the system keeps the platform on a line between the tops of the two support structures, then the path between the support structures is a very flat ellipse approximating a line. When the amount of line to an object is the same from each support structure, then the upward and downward path of an object follows the Z-axis if the heights of the two support structures are the same. Upward and downward motion of an object when the amount of line to an object from each support structure is greater on one side than the other does not follow a linear path parallel to the Z-axis but rather is curved down and toward the closest support structure. Even though the motion of the object moved by embodiments of the invention is not required to be linear, it is much simpler to describe the invention in terms of Z movement related elements and Y movement related elements since the primary component of movement for these elements is along the respective axis, albeit at times slightly curved.

Embodiments of the invention move objects through two-dimensions using one line. The line is coupled with opposing sides of a platform and either attaches to the platform or to a Z movement device. The line is driven by a motor and pulls the platform which may comprise an object from one side of the Y-axis to the other. The Z movement device displaces the line to or from the system in order to move the object primarily in the Z-axis. The Z movement device may be a lever, a screw-drive, block and tackle, or any other mechanism which can be configured to displace line. A motor driving the line may comprise a stepping motor or standard motor with a brake system in order to lock motion when the motor has stopped rotating. Any type of device that can move line can be used in place of a motor. There is no need for a complex computer control system since the Z-axis displacement is substantially independent of Y axis movement over a coverage area meaning that as the platform carrying the platform moves to the middle of the area of coverage in Y space, the Z-axis displacement is the deepest, see FIG. 2 path 200. As the platform moves towards a support structure, the Z-axis displacement is the highest. This gradual displacement in the middle of the coverage area makes embodiments well suited for various uses including but not limited to filming use, stadium use and strip mining use and provides a built in safety measure since the system naturally follows an elliptical path with foci centered at the support structures that can be as flat or circular as desired. In addition, by feeding line with the Z movement device into the Y-axis line, the platform can be moved horizontally while maintaining a constant Z-axis elevation. This can be accomplished manually or with a simple controller. In addition, since the lines may be commanded from one point, distantly located motors and electrical cables may be utilized but are not required. Many types of useful objects or devices may then be attached to the platform including devices that require external power or devices that possess their own power and are operated via wireless signals. For instance, it is possible to attach a camera or any other useful type of equipment to the platform.

Figure 1:
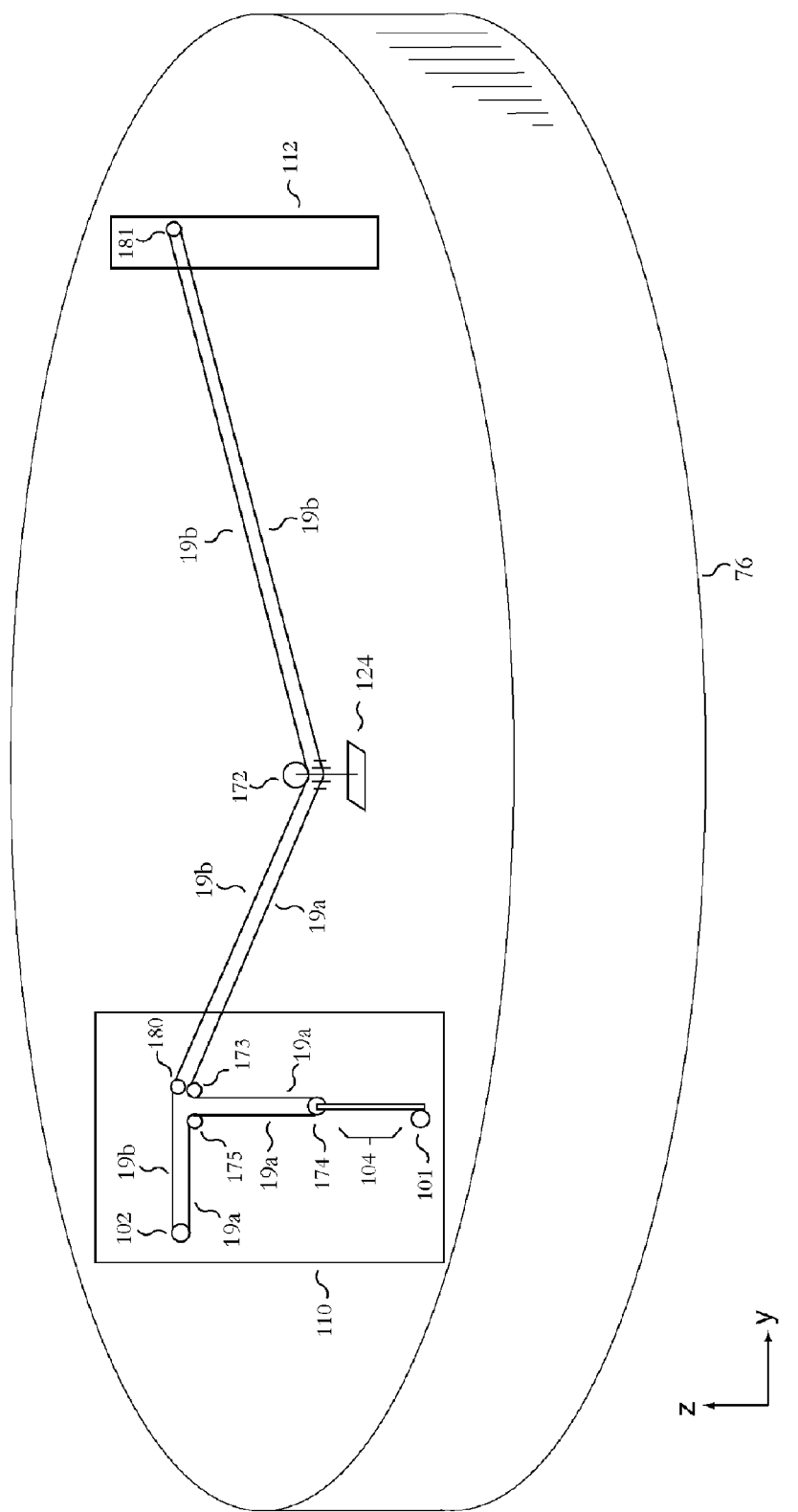
FIG. 1 shows a perspective view of an embodiment of the invention.

FIG. 1 shows a perspective view of an embodiment of the system. This embodiment is mounted in stadium 76. The two axes are shown in the figure with the Y-axis shown left to right and the Z-axis shown bottom to top of the page. In this configuration, support structures 110 and 112 separate platform 124 from the ground. Platform 124 provides a mobile attachment point for an object to be moved including but not limited to cameras, mining scoops, logging hooks, or any other utility enabling device applicable to any industry.

Platform 124 is supported and is moved in two dimensions by one line. The line forms a "V" shape when viewed from the perspective of FIG. 1. By decreasing the length of the line deployed into the system via Z-axis motor 101 and Z movement device 104, platform 124 is raised. Conversely, increasing the length of the line deployed, platform 124 is lowered. YZ movement line sides 19a and 19b are different sides of the same piece of line. Control of Y and Z-axis motors can be in the form of simple switches, potentiometers, or an optional but not required computer control system.

Z movement device 104 is coupled with YZ movement line side 19a. Sheave 172 rides on YZ movement line side 19b. By rotating Y-axis motor 102 (attached to a bull wheel that drives the line but is not shown for ease of viewing), thereby decreasing the amount of line on YZ movement line side 19a, which increases the amount of line on Y movement side 19b, the platform moves mainly in the negative Y direction, or to the left as shown in the figure.

Z movement device 104 can be any mechanism which can displace sheave 174 and is not required to be a line, but rather can be a screw drive, hydraulic system, fulcrum or any other device capable of moving sheave 174. Z movement motor 101 may be utilized to power any type of Z movement device desired. Y-axis motor 102 drive pulley is not shown for ease of illustration. Drive pulleys and drum winches are well known to those skilled in the art and embodiments that minimize line wear and provide anti-derailing features may be interchanged to drive the line in the system. Any device that can pull move line through it can be used in place of a drive pulley or bull wheel.

An embodiment of the invention can run fiber optics cables or power cables along YZ movement line side 19a or 19b from support structure 110 to platform 124. Support structure 112 can alternatively supply power to the platform in the same manner. Platform 124 may alternatively house devices with collocated power supplies negating the need for external power cables. Devices attached to platform 124 may include wireless or other remote controlled devices.

Note that Z movement device 104 can comprise a sequence of pulleys for multiplying the Z-axis traversal, and may also utilize a block or other device for disabling travel in case of breakage within Z movement device 104. By placing a backup means of limiting the upward travel of sheave 174, the platform can be configured to never reach the ground beneath it even if a failure at or beneath Z movement device 104 were to occur.

FIG. 2 shows a YZ-axis reeving diagram for an embodiment of the invention employing distantly located winches for Y and Z-axis movement and shows two horizontal paths of motion depending on the height of the platform. FIG. 2 shows path 200 that the platform travels when rotating Y-axis motor 102 without asserting Z movement device 104. Note that this elliptical path would be deeper and more circular as seen in FIG. 2 path 201 if more line was injected into the system via Z movement device 104. Note that even though the Y-axis motor rotation produces a path that slightly varies in Z-axis height, this displacement is minimal and therefore does not require a computerized control system or any control system for that matter. In this regard is the path were required to maintain a constant height in Z-axis direction over the course of travel, an operator could simply activate Z movement device 104 in order to inject a small amount of line into the system as platform 124 towards either support structure holding sheaves 171 and 173 for example. Alternatively, a control system could be employed in order to do this automatically, but is in no way required. For embodiments of the invention used in areas where Z displacement minimization during Y traversal is required, the control system may utilize Y displacement to calculate the amount of Z movement required to keep a level platform path. Since the supporting endpoints form the foci of a two-dimensional ellipse, measurements of amount of line deployed on each side of the supports determines the location of the platform on the ellipse. Since the measurements determine the Z height, the amount of deployed line can be adjusted by the Z-axis motor while the Y-axis motor is moving the platform in order to raise the platform as it approaches the mid-point of between the supports in order to compensate for the dip in the elliptical path. As the equation for an ellipse is known, an iterative loop which activates the Z-axis motor until an acceptable error is achieved is one possible control algorithm that will yield a constant Z height during Y traversal. Any other algorithm that would keep the platform traveling in a desired path whether linear or not is in keeping with the spirit of the invention.

Y movement in the positive Y direction, to the right in the figure, is accomplished by rotating Y-axis motor 102 counter-clockwise in the diagram. As Y-axis motor 102 rotates counter-clockwise, line side 19b moves down from sheave 171 that is coupled with support structure 110 (not shown for ease of illustration) and from sheaves 172, 173, 174, 175. This pulls platform 124 to the right in the figure, in the positive Y-axis. As line side 19b travels upward from Y-axis motor 102, line side 19a heads up to sheave 176 and to platform 124. The one line in the invention is designated with two reference characters 19a and 19b to signify which side of the platform the line is connected to. The arbitrary dividing point for the designation is at Y-axis motor 102. Note that sheaves 171, 176, 173 and 175 may be eliminated in embodiments of the invention that utilize motors mounted in supports 110 and/or 112. One skilled in the art will recognize that other sheaves may be moved or eliminated while keeping with the spirit of the invention. Reversing the direction of Y-axis motor 102 pulls platform 124 in the negative Y-axis direction, to the left in the diagram.

Retracting Z movement device 104 raises platform 124 primarily in the vertical direction and visa versa. As Z movement device 104 extends, YZ movement line side 19b moves upward into sheaves 173 and 175 that are coupled with support structure 112 (again not shown for ease of illustration). Since both sides of platform 124 have increased line length, the platform lowers. Motion of the Z movement device in the opposite direction raises the platform.

Figure 3:
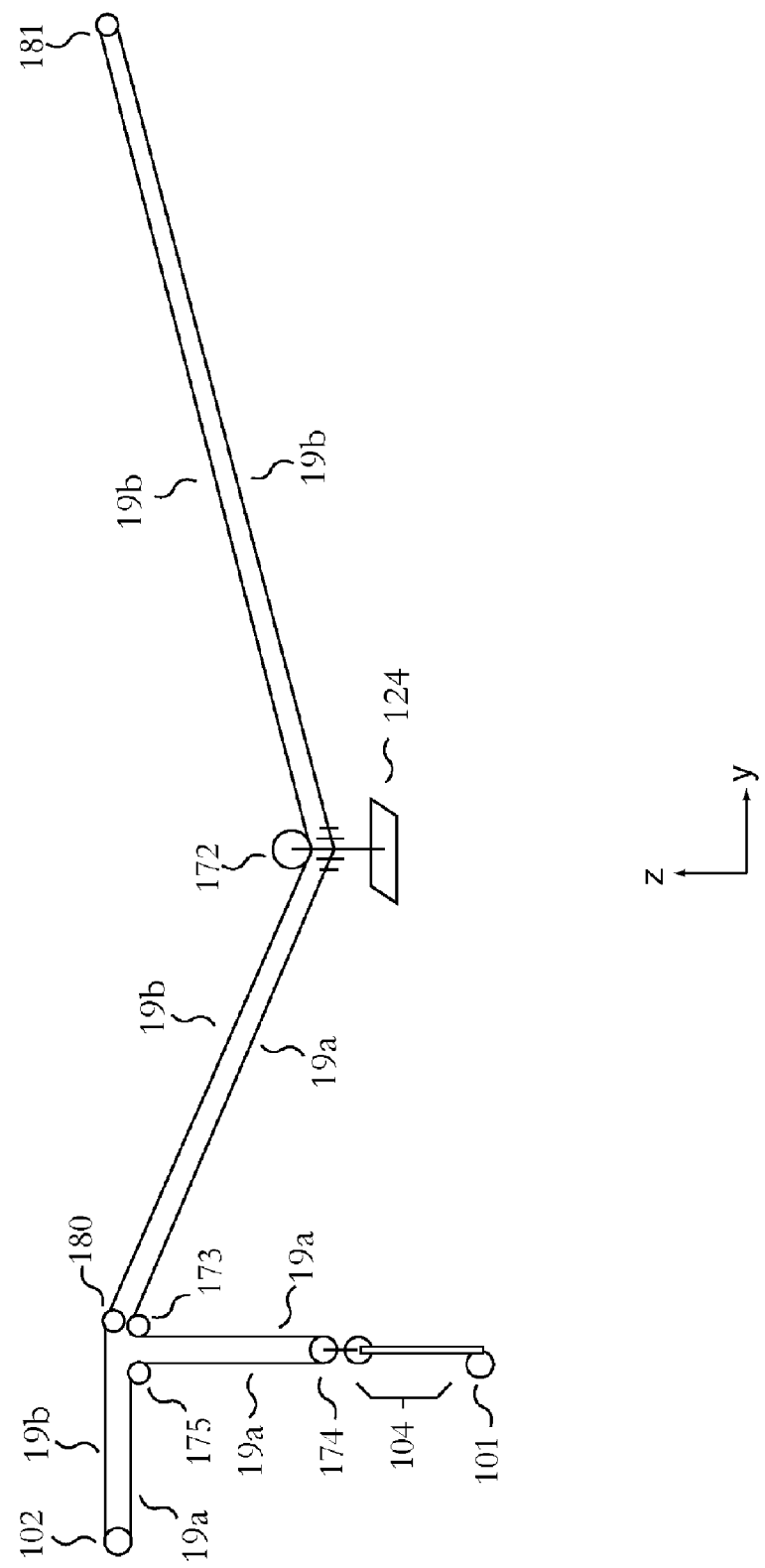
FIG. 3 is a YZ-axis reeving diagram for an embodiment of the invention employing Y and Z-axis movement devices on the same side of the invention.

FIG. 3 shows a YZ-axis reeving diagram for an embodiment of the invention employing Y and Z-axis movement devices on the same side of the invention. Y movement in the positive Y direction, to the right in the figure, is accomplished by rotating Y-axis motor 102 counter-clockwise in the diagram. As Y-axis motor 102 rotates counter-clockwise, line side 19b moves into Y-axis bull wheel (not shown for ease of illustration) through sheaves 180, 172, 181. This pulls platform 124 to the right in the figure, in the positive Y-axis. As line side 19a travels out of Y-axis motor 102, line side 19a heads to sheave 175, 174, 173 and then to platform 124. The single line in the system is designated with two reference characters 19a and 19b to signify which side of the platform the line is connected to. The arbitrary dividing point for the designation is at Y-axis motor 102. Note that sheave 180 may be eliminated in embodiments of the invention that utilize a Y-axis motor mounted in high enough in support 110 (not shown for ease of illustration) to clear sheaves 173 and 175. One skilled in the art will recognize that other sheaves may be moved or eliminated while keeping with the spirit of the invention. Reversing the direction of Y-axis motor 102 pulls platform 124 in the negative Y-axis direction, to the left in the diagram.

Retracting Z movement device 104 raises platform 124 primarily in the vertical direction and visa versa. As Z movement device 104 extends, YZ movement line side 19a moves upward into sheave 173. The line does not move into sheave 175 since the next span is to Y-axis motor 102 which is not a free rotating sheave. As line moves to platform 124 from sheave 173, downward force from platform 124 on sheave 172 pulls line side 19b from platform 124 into sheave 181 and through sheave 172. Since both sides of platform 124 have increased line length, the platform lowers. Motion of the Z movement device in the opposite direction raises the platform.

Figure 4:
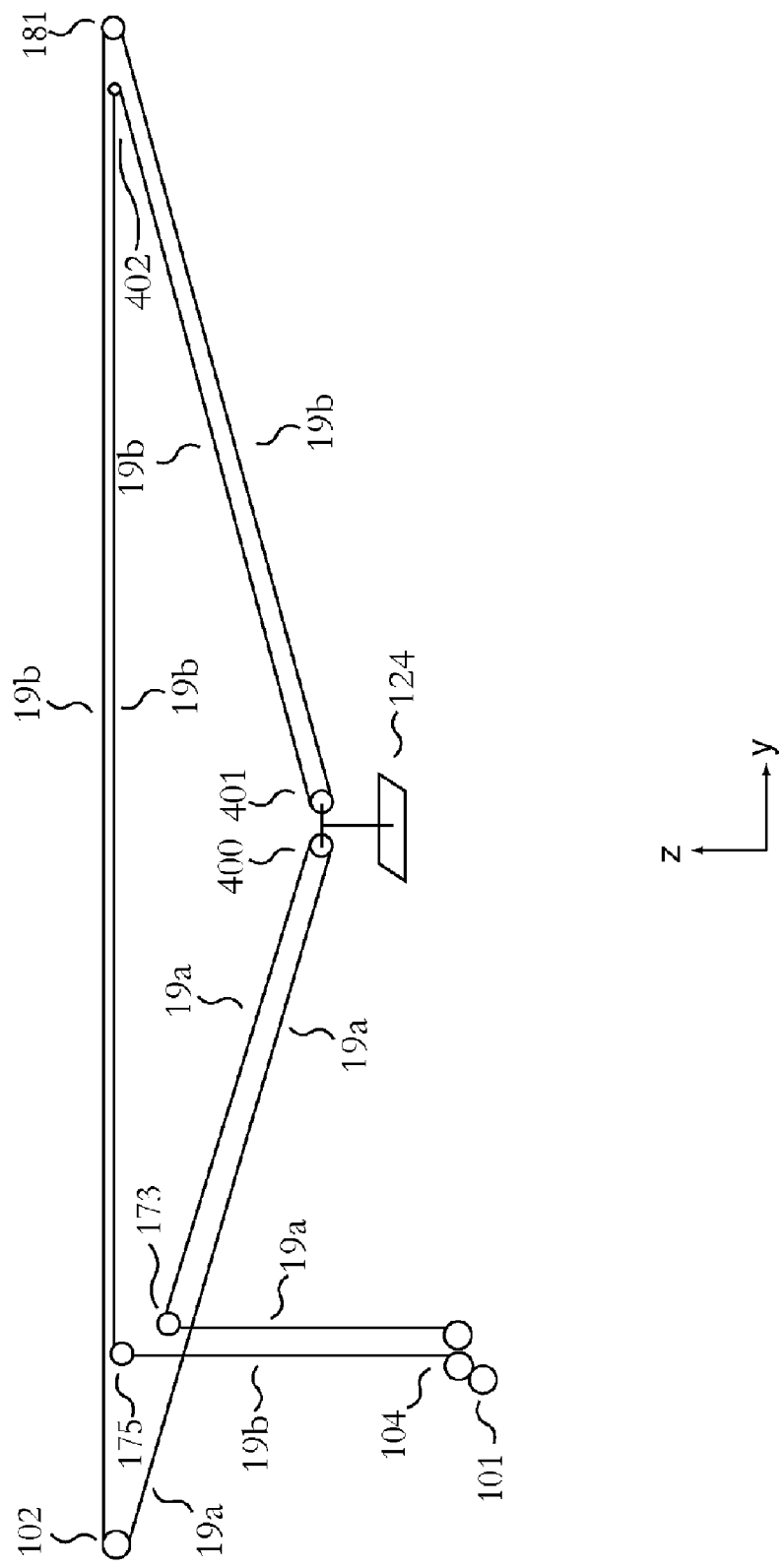
FIG. 4 shows the YZ-axis reeving diagram for an embodiment of the invention employing line that is configured with attachment point at Z movement device as opposed to attachment at the platform.

FIG. 4 shows a YZ-axis reeving diagram for an embodiment of the invention employing line that is configured with attachment point at Z movement device as opposed to attachment at the platform. Y movement in the positive Y direction, to the right in the figure, is accomplished by rotating Y-axis motor 102 counter-clockwise in the diagram. As Y-axis motor 102 rotates counter-clockwise, line side 19b moves into Y-axis bull wheel (not shown for ease of illustration) coupled with Y-axis motor 102 through sheaves 181, 401, 402, 175. As line side 19b leaves Y-axis bull wheel attached to Y-axis motor 102, it becomes designated line side 19a. Line side 19a travels into sheave 400 to sheave 173. This motion of the single line in the system pulls platform 124 to the right in the figure, in the positive Y-axis. The arbitrary dividing point for the designation change from 19a to 19b on the two sides of the line is at the Y-axis motor and runs on each side of that dividing point to the endpoints of the line at Z movement device 104. Z movement device 104 in this embodiment is a two wheel winch, however any device can be used that is configured to deploy and remove lengths of line sides 19a and 19b into the system. One skilled in the art will recognize that some sheaves may be moved or eliminated while keeping with the spirit of the invention. Reversing the direction of Y-axis motor 102 pulls platform 124 in the negative Y-axis direction, to the left in the diagram.

Rotating Z-axis motor 101 which in turn rotates this embodiment of Z movement device 104 (here a two wheel winch), causes an increase the length of deployed line in the system on line sides 19a and 19b lowers the platform in the Z-axis direction. As Z movement device 104 rotates in one direction, YZ movement lines 19a and 19b move upward into sheave 173 and 175 respectively. Sheaves 173 and 175 may be coupled with support structure 110 (not shown for simplicity). As line moves to platform 124 from sheave 173 into sheave 400, and from sheave 175 to sheave 402 and into sheave 401, both sides of platform 124 have increased line length, and hence the platform lowers. Operating the Z movement device in the opposite direction raises the platform.

Figure 5:
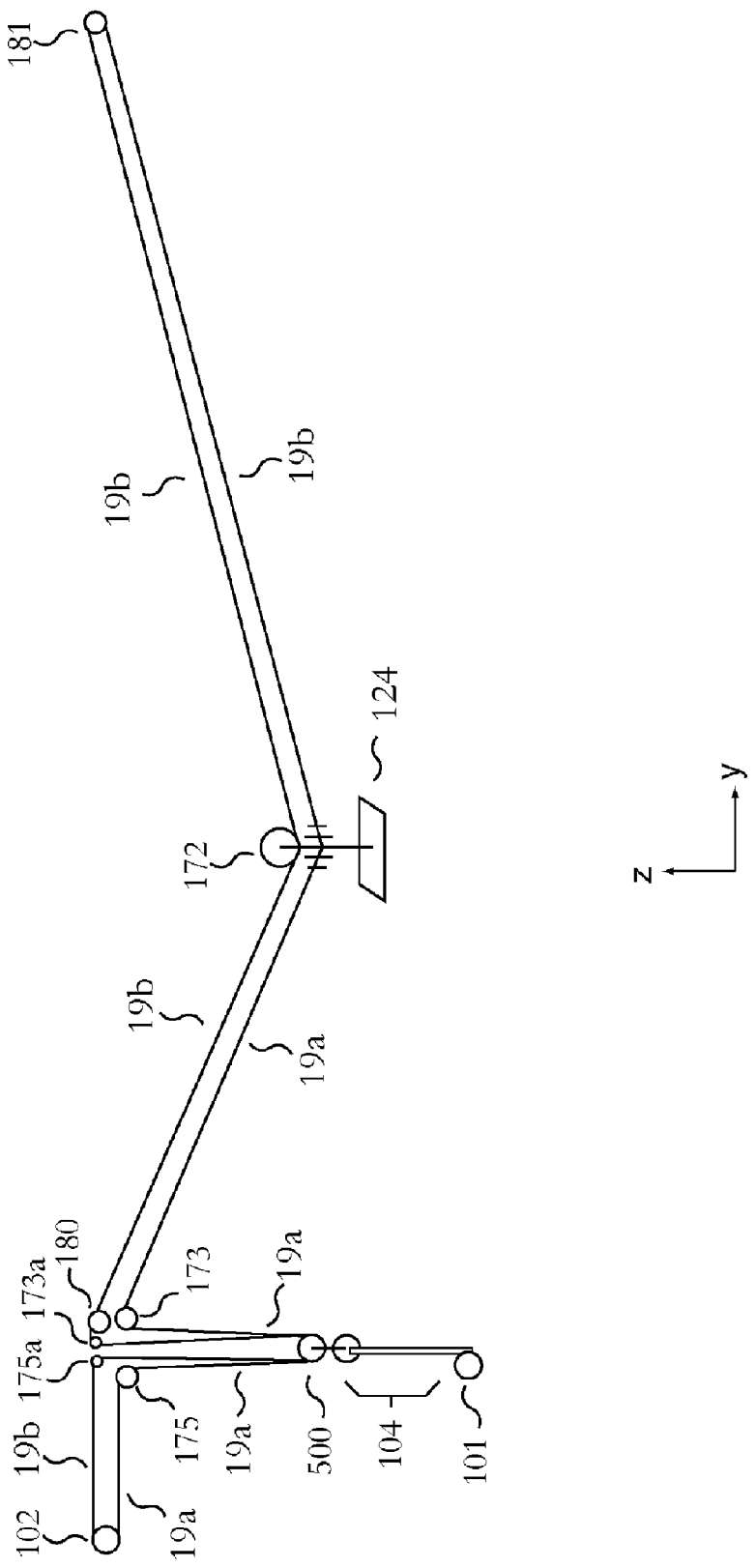
FIG. 5 is a YZ-axis reeving diagram for an embodiment of the invention employing dual Z-axis displacement.

FIG. 5 shows the YZ-axis reeving diagram for an embodiment of the invention employing dual Z-axis displacement devices. Y movement in the positive Y direction, to the right in the figure, is accomplished by rotating Y-axis motor 102 counter-clockwise in the diagram. The difference between this embodiment and the embodiment shown in FIG. 3 is 175a and 173a which operate on line side 19b exactly in the same manner as sheaves 175 and 173 operate on line side 19a. In addition, sheave 500 may be a double sheave comprising two separate sheaves. As Y-axis motor 102 rotates counter-clockwise, line side 19b moves into Y-axis bull wheel attached to Y-axis motor 102 through sheaves 175a, 500 (first sheave), 173a, 180, 172 and 181. This pulls platform 124 to the right in the figure, in the positive Y-axis. As line side 19a travels out of Y-axis motor 102, line side 19a heads to sheave 175, 500 (second sheave), 173 and then to platform 124 where the termination is shown as broken vertical lines (also shown in the close up view in FIG. 6, terminators 600). The one line is designated with two reference characters 19a and 19b to signify which side of the platform the line is connected to. The arbitrary dividing point for the designation is at Y-axis motor 102. Note that sheave 180 may be eliminated in embodiments of the invention that utilize a Y-axis motor mounted in high enough in support 110 to clear sheaves 173, 173a, 175 and 175a. Support 110 may house all sheaves to the left of platform 124 in the figure, but is not shown for ease of viewing. One skilled in the art will recognize that other sheaves may be moved or eliminated while keeping with the spirit of the invention. Reversing the direction of Y-axis motor 102 pulls platform 124 in the negative Y-axis direction, to the left in the diagram.

Extending Z movement device 104 vertically increases the length of deployed line in YZ movement line side 19a and 19b. This lowers the platform in the Z-axis direction. As Z movement device 104 increases in length, for example in the case of a screw block where a large screw rotates which unwinds a threaded block causing the block to rise, YZ movement line side 19a moves upward into sheave 173 while at the same time line side 19b moves upward into sheave 173a. The line does not move into sheave 175 or 175a since the next span is to Y-axis motor 102 which is not a free rotating sheave. As line moves to platform 124 from sheave 173, and 173a and 180, the platform lowers. Motion of the Z movement device in the opposite direction raises the platform.

Embodiments of the invention may comprise support structure 110 and 112 which may or may not comprise two sheaves each. Stadiums may contain support points, poles or other structures which may eliminate the need for separate support structures 110 and 112. More sheaves may be added to embodiments of the invention that require routing of line through obstacles. Any of the sheaves utilized in the system may comprise any device that can guide the line into the sheave securely.

Figure 6:
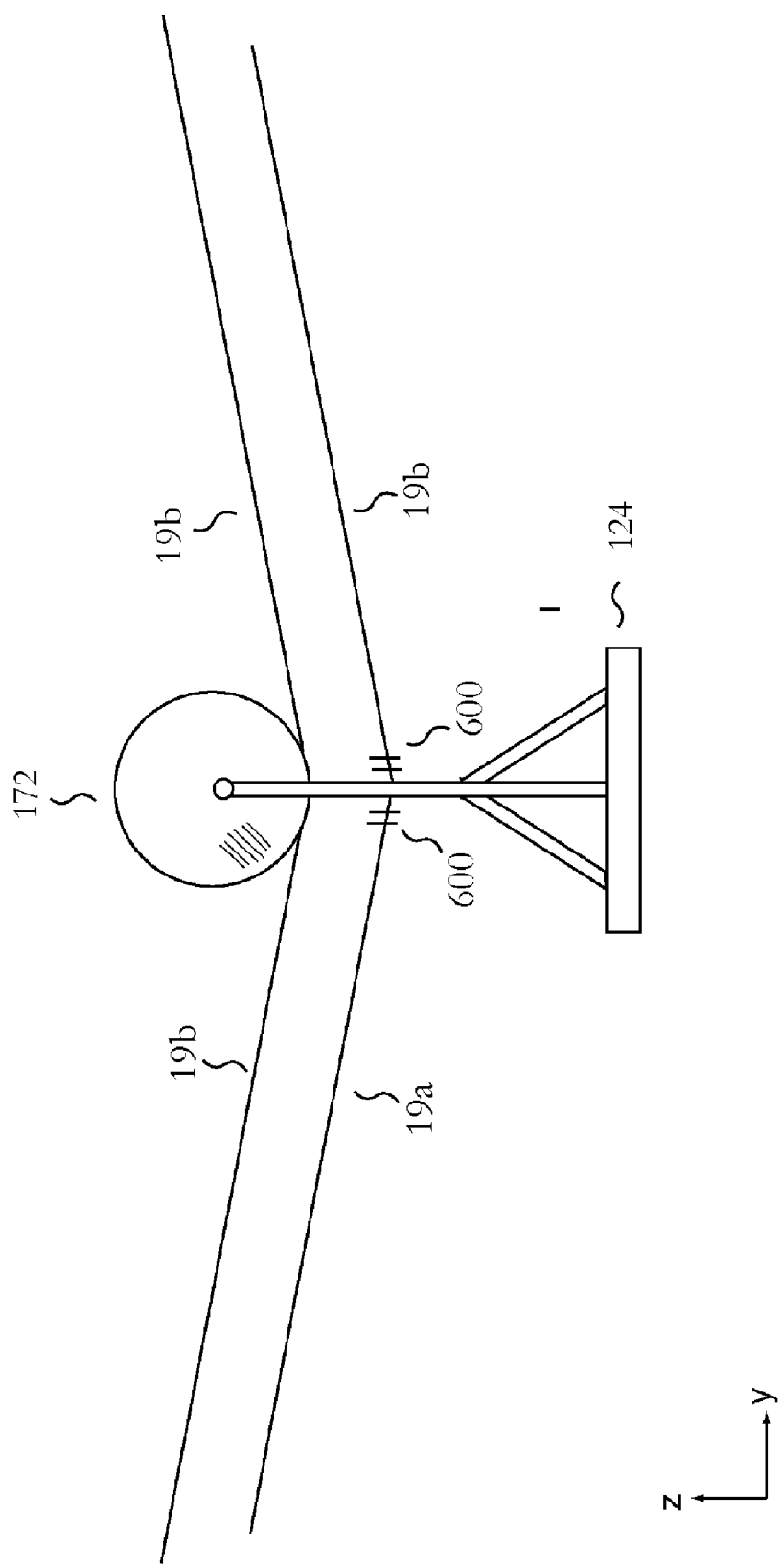
FIG. 6 is a perspective view of an embodiment of the platform.

FIG. 6 shows close up perspective of platform 124 in one embodiment of the invention. This embodiment of the platform is suspended from line side 19b via sheave 172. Any useful object or device may be mounted on the platform. Terminators 600 connect the line ends to the platform.

FIG. 1 shows an embodiment of the invention that uses single sheaves at all line direction points. Other embodiments may use multiple sheave arrangements virtually anywhere where a single sheave is used in order to change direction of a line and further prevent derailing. Sheaves with groove shapes and rounded edges that minimize the lateral friction on lines passing through the sheaves may be utilized in order to minimize the amount of wasted power in the system. Embodiments of the invention may use any type of sheave that works with the line specified for the system. Any linear connection device may be utilized in place of line, such as but not limited to cable. A dynamometer may be inserted in-line between Z-axis motor 101 and Z movement device 104 in order to provide tension readings.

An embodiment of the invention comprises a simple block and tackle utilized with the Z movement device 104. A block and tackle may be utilized in order to provide a Z-axis N-factor multiplier. Block and tackle assemblies are well known in the art and could readily be applied between Z movement device 104 and sheaves 173 and 175 in FIG. 3 in order to multiply the amount of line injected into the system per unit of extension of Z movement device.

Figure 7:
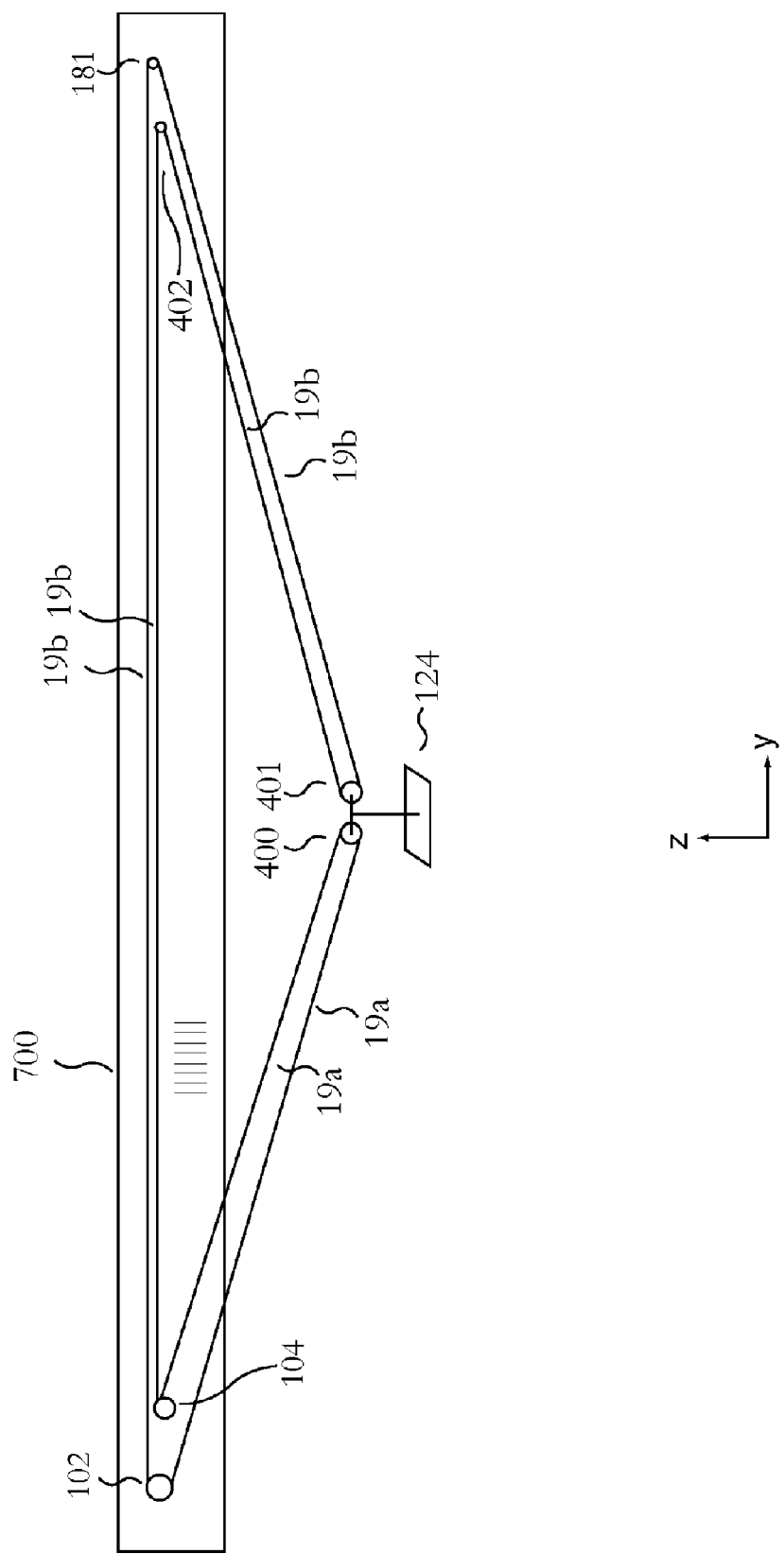
FIG. 7 is a side view of the interior of an embodiment of the invention comprising a mounting beam.
Figure 13:
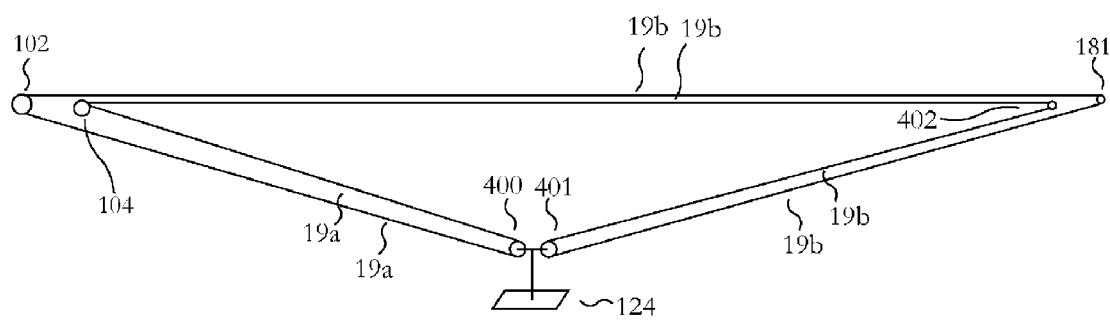
FIG. 13 shows the YZ-axis reeving diagram for an embodiment of the invention employing line that is configured with attachment point at Z movement device situated near Y-axis motor 102.
Figure 13:
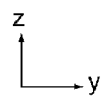
Figure 14:
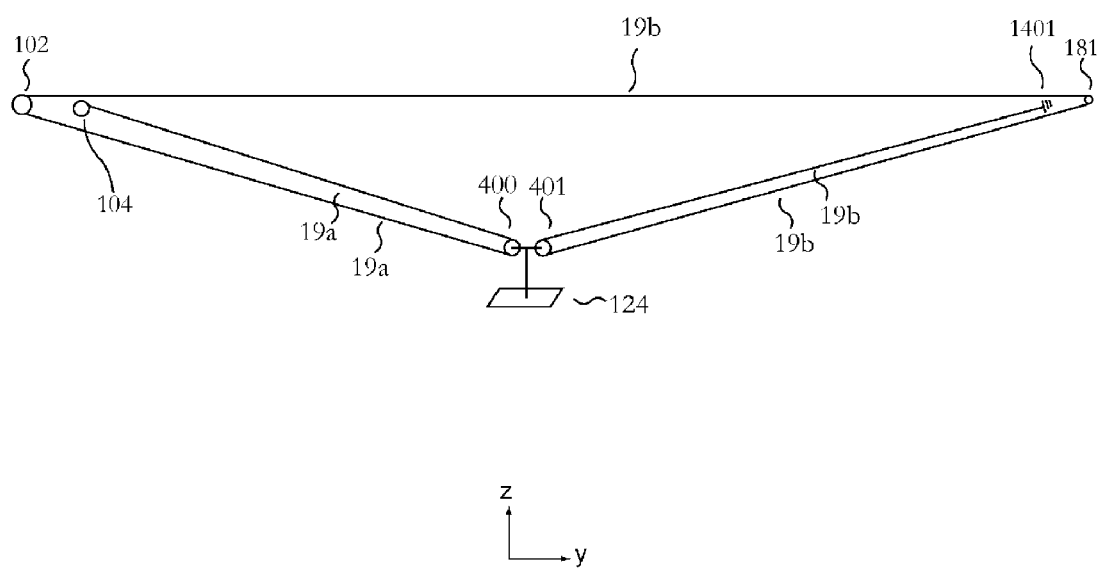
FIG. 14 shows the YZ-axis reeving diagram for an embodiment of the invention comprising a modified reeving with respect to FIG. 13.

FIG. 7 is a side view of the interior of an embodiment of the invention comprising a mounting beam. Mounting beam 700 is used as a mount for sheaves 181 and 402 and Y-axis motor 102 and associated bull wheel and Z-axis motor 104 and associated reel(s). The line in the system is coupled at Z movement device 104. Y movement in the positive Y direction, to the right in the figure, is accomplished by rotating Y-axis motor 102 counter-clockwise in the diagram. As Y-axis motor 102 rotates counter-clockwise, line side 19*b* moves into Y-axis bull wheel (not shown for ease of illustration) coupled with Y-axis motor 102. As line side 19*b* leaves Y-axis bull wheel attached to Y-axis motor 102, line side 19*b* becomes designated line side 19*a* although both lines are the same contiguous piece of line that is merely redirected at the bull wheel. Line side 19*a* travels into sheave 400. As Y-axis motor 102 rotates counterclockwise, line side 19*b* moves around sheave 181 from sheave 401. Z movement device 104 is implemented in this embodiment as a Z-axis motor driving a winch. Since the Z movement device 104 is not required to move, the motion of the Y-axis is substantially independent of motion in the Z-axis meaning that the main component of motion in the system in the Y-axis is generally accomplished via the Z-axis motor and conversely the main manipulator of Z-axis motion is the Z-axis motor generally speaking. This counterclockwise motion of the single line in the system about the bull wheel attached to Y-axis motor 102 pulls platform 124 to the right in the figure, in the positive Y-axis. The arbitrary dividing point for the designation change from 19*a* to 19*b* on the two sides of the line is at Y-axis motor 102 and runs on each side of that dividing point to the endpoints of the line at Z movement device 104. Z movement device 104 in this embodiment is a two wheel winch, however any device can be used that is configured to deploy and remove lengths of line sides 19*a* and 19*b* into the system. One skilled in the art will recognize that some sheaves (e.g., pulleys) may be moved or eliminated while keeping with the spirit of the invention. Reversing the direction of Y-axis motor 102 pulls platform 124 in the negative Y-axis direction, to the left in the diagram. FIG. 13 shows an embodiment of FIG. 7 without any coupling to a beam of any kind. This embodiment also shows the YZ-axis reeving diagram for an embodiment of the invention employing line that is configured with attachment point at Z movement device situated near Y-axis motor 102. FIG. 14 shows the YZ-axis reeving diagram for an embodiment of the invention comprising a modified reeving with respect to FIG. 13. In this embodiment termination point 1401 is used to provide an attachment point that results in Z movement asserted from Z movement device 104 to affect the length of line displaced in line side 19*a* without altering the length of displaced line in line side 19*b*. This embodiment therefore biases Z movement with a slight Y movement but requires less line.

Rotating Z-axis motor 101 which in turn rotates this embodiment of Z movement device 104 (here for example a two wheel winch), causes an increase in the span of deployed line sides 19*a* and 19*b*. Such increases lower the platform in the Z-axis direction. As Z movement device 104 rotates in the counterclockwise direction, line sides 19*a* and 19*b* move are reeled into the winch (or two wheel winch not shown for brevity) attached to Z-axis motor 104 from sheaves 400 and 402 via 401. Rotation of Z-axis motor in the opposite direction conversely lowers the platform.

Figure 8:
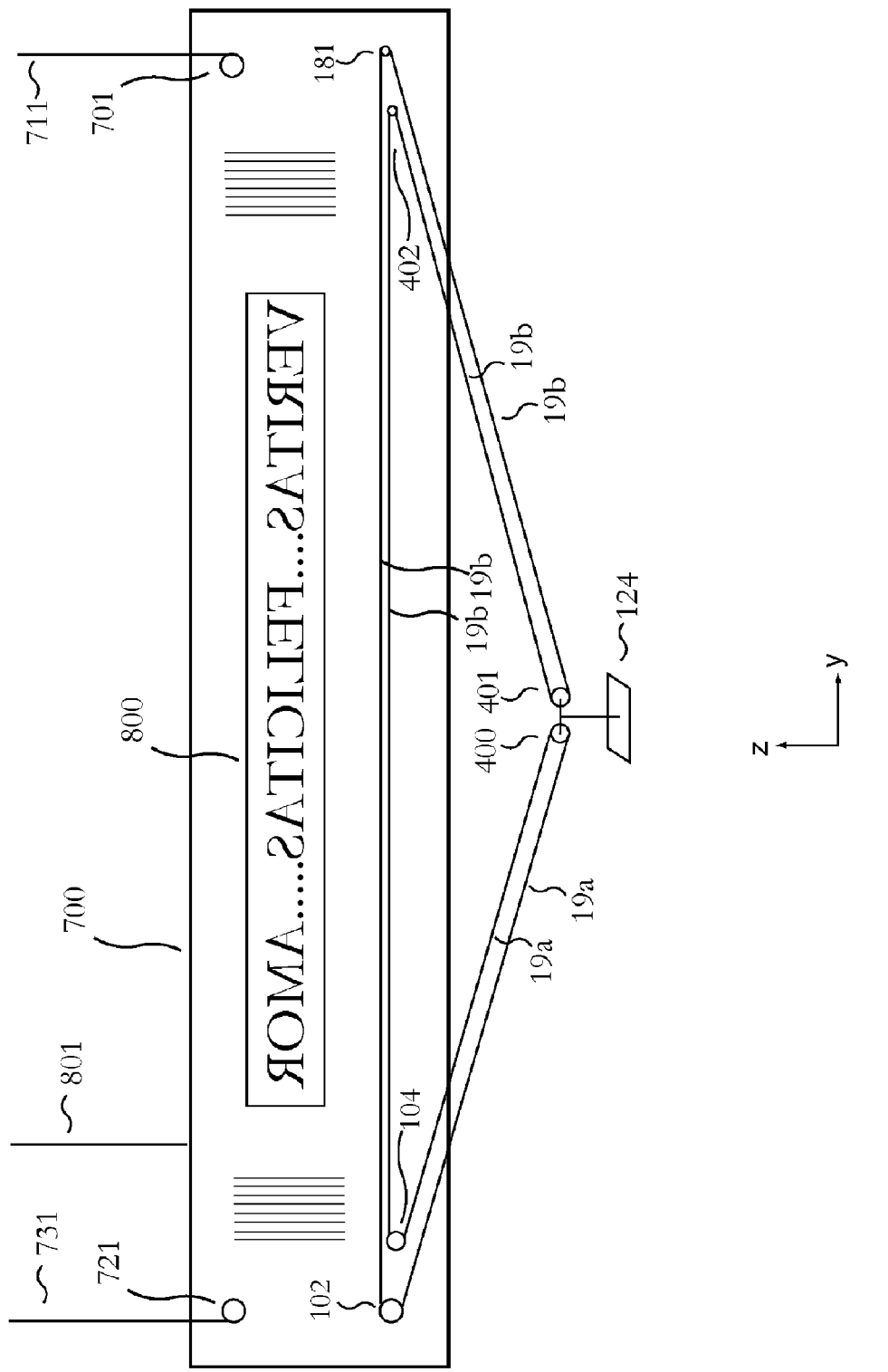
FIG. 8 is a side view of the interior of an embodiment of the invention comprising a mounting beam and visual display element and supporting and communications lines.

FIG. 8 is a side view of the interior of an embodiment of the invention comprising a mounting beam and visual display element and supporting and communications lines. A panel on the front of this embodiment may comprise a visual display element. Examples of things considered visual display elements include, but are not limited to, advertisements, text messages, images, videos, or any other visible data. Such visual display elements may be communicated to mounting beam via an interconnection fabric such as a network (wireless or otherwise). Communications line 801 may also comprise power lines although the batteries may also be supported by or between front and rear panels. Support lines 711 and 731 may couple with winches 701 and 721 respectively, or the lines may directly attach to mounting beam 700 with winches mounted above in a preexisting structure. Rotation of winches 701 and 721 may be simultaneous or may be independent for various effects such as a wave like pattern performed after for example a hockey goal is scored. Use of one winch 701 is accomplished by removing winch 721 and replacing it with a sheave the runs line 731 to winch 701. A single winch can be mounted above the beam with two drums that would be capable of raising mounting beam 700 the same amount on both sides simultaneously. Use of one line is possible for embodiments of the invention that have a low enough center of gravity. Visual display element 800 (shown from behind as mount on rear portion of mounting beam 700) may comprise a flat panel screen, a dot matrix readout, speakers, fog machines or any other device used to communicate visual display elements. Although shown in rectangular format, mounting beam 700 may take any shape. Communications line 801 may be used to send messages (e.g., visual display elements) to visual display element 800, or the messages may be sent via wireless communications. In addition, control signals for Z-axis motor 104 and Y-axis motor 102 may be sent over communications line 801 or via wireless signals as well. Any camera mounted on platform 124 may output signals over communications line 801 or via wireless means.

Figure 9:
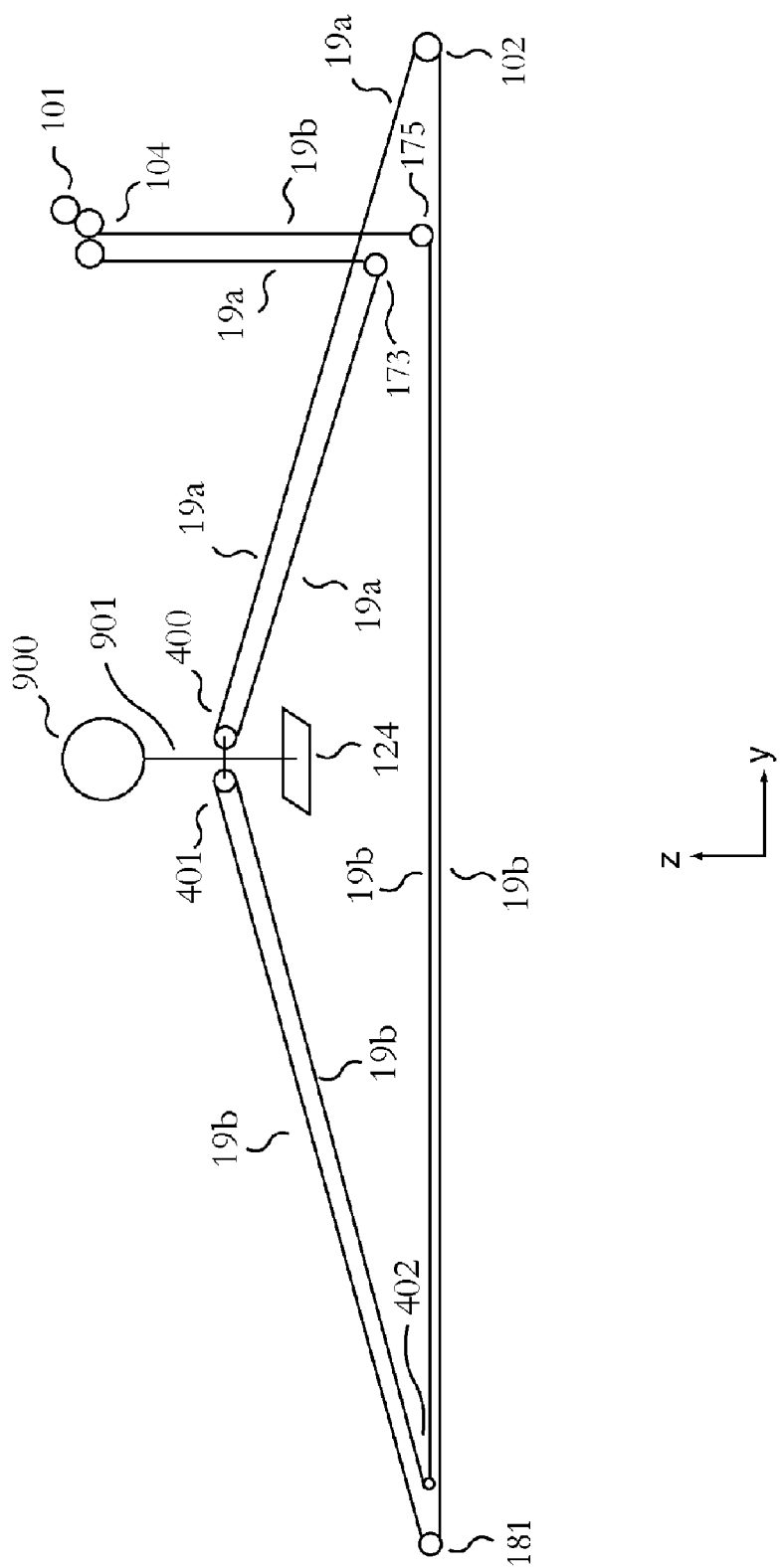
FIG. 9 is a YZ-axis reeving diagram for a buoyant embodiment of the invention.
Figure 10:
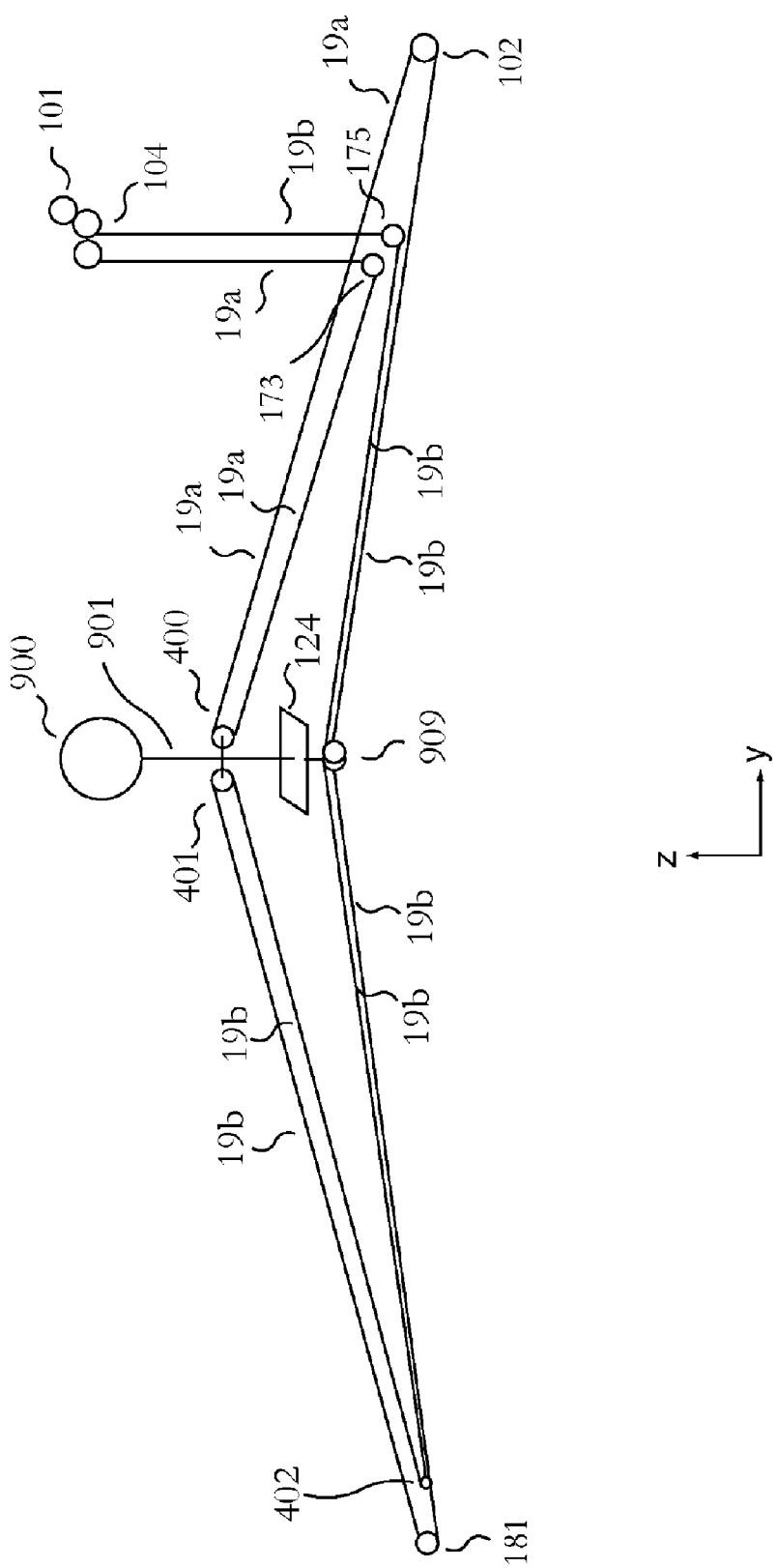
FIG. 10 is an alternate reeving diagram for FIG. 9.
Figure 11:
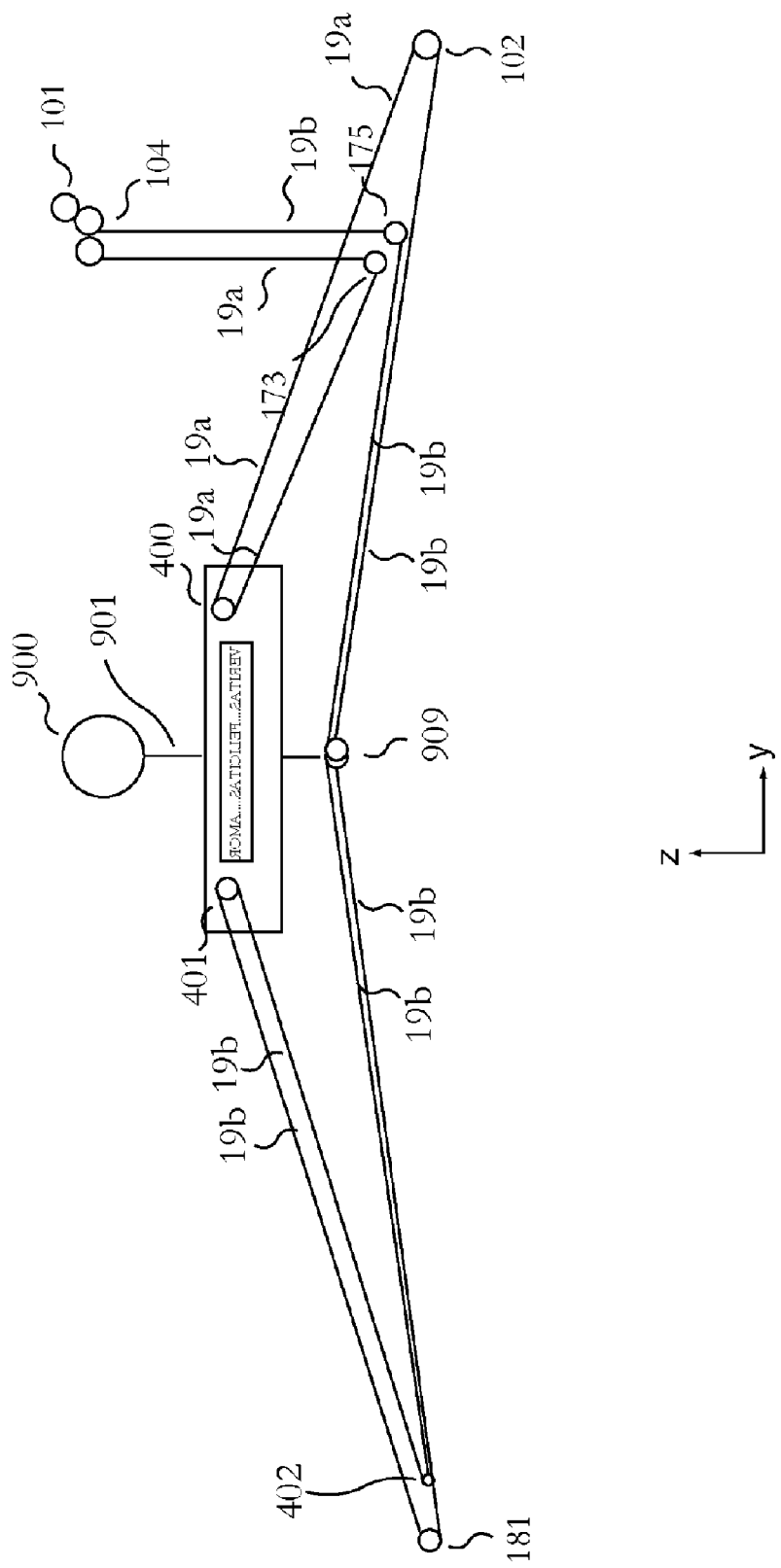
FIG. 11 is the alternative reeving diagram for FIG. 9 further comprising a visual display element.

FIG. 9 is a YZ-axis reeving diagram for a buoyant embodiment of the invention. This buoyant embodiment may be utilized with alternate reeving through redirection sheaves coupled with the platform if there is no direct path between Y-axis motor 102 and sheave 181. This alternate reeving is shown in FIG. 10 with redirection sheaves 909 redirecting line over the area below. The connective element between sheaves 400 and 401 may be replaced by a visual display element and/or beam which is shown in FIG. 11. Coupling Y-axis motor 102 and Z-axis motor 101 may comprise direct mounting in the beam or indirect mounting on the ground.

Figure 12:
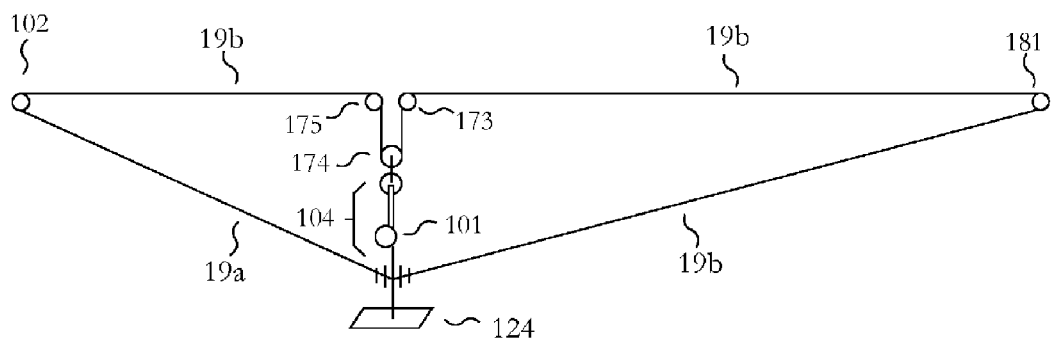
FIG. 12 is a YZ-axis reeving diagram for an embodiment of the invention employing a Z-axis movement devices coupled with the platform.
Figure 12:
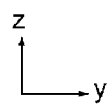

FIG. 12 is a YZ-axis reeving diagram for an embodiment of the invention employing a Z-axis movement devices coupled with the platform. In this embodiment Z-axis motor 101 asserts Z movement device 104 which pulls rope from both sides of pulley 174 thereby raising and lowering platform 124. Note that Y-axis motor 102 may be switched with sheave 174 in this or any of the preceding embodiments comprising these components as one skilled in the art will recognize. In this embodiment this means that the line in and out of sheave 175 would be 19a. In this embodiment power for Y-axis motor 102 and Z-axis motor 101 may derive from a battery or other power source on platform 124 or a power line for example hanging from above or festooned along line 19a or 19b.

Any additional instance of the embodiment of the invention comprising the line or lines reeved in the spirit of the invention whether or not identically reeved as the primary reeving is reeved is termed a nested reeving. Embodiments of the invention may be nested for example to allow more than one object to be moved within a given volume of space at the same time or to provide for an angular offset with respect to a plurality of platforms. Nested embodiments may be independent of one another, meaning that any two of the embodiments described herein may be utilized in the same general space as any other embodiment of the invention independently. Nested embodiments may also be dependent meaning that the platforms of the pluarlity of embodiments comprising a nested configuration are coupled in some way. Nested embodiments of the invention that are mounted on other embodiments of the invention are termed recursive embodiments. For example a beam embodiment may comprise a second embodiment hanging underneath the first embodiment with any angular offset for example. A dependent non-recursive embodiment in general comprises a coupling between the platforms or replacement of one or both platforms with a rod or pole that may be telescoping as per FIG. 15. Nesting may be accomplished with for example two non-buoyant embodiments in air or water, or with two buoyant embodiments whether in air or water, or with a non-buoyant embodiment above or below a buoyant embodiment whether either embodiment is in air or water or space. It is also possible to nest more than two embodiments and with pre-planned simulation of flight paths, users of the system can move a set of objects through a set of complex paths. The ability to plan an object's path has significant benefits including collision avoidance and repeatability for example. When filming a movie for example, it is beneficial to move cameras and actors in coordinated, repeatable paths so that scenes may be filmed for a movie without separate moving objects/actors colliding. Pre-planned simulation of flight paths may be utilized to control the actual flight paths in a repeatable fashion. Although the reeving of the two non-buoyant embodiments is shown in a parallel configuration this is done for ease of illustration as the sheaves in an actual realization in the supports may be closer or more spread about than is shown. Whether nested or not, embodiments of the invention may comprise radar, optical or acoustic sensors anywhere in the system, for example at platform 124 in order to provide collision avoidance with stationary or moving objects. Examples of stationary objects may include trees or buildings while examples of moving objects may comprise vehicles, sporting implements such as soccer balls, baseballs, footballs, track and field implements or any other object. By calculating the trajectory of the stationary or moving object and calculating the position of platform 124 and supporting line sides, platform 124 may be moved, thereby moving the line sides and thereby avoiding a collision with either platform 124 or line sides with an external stationary or moving object.

Figure 15:
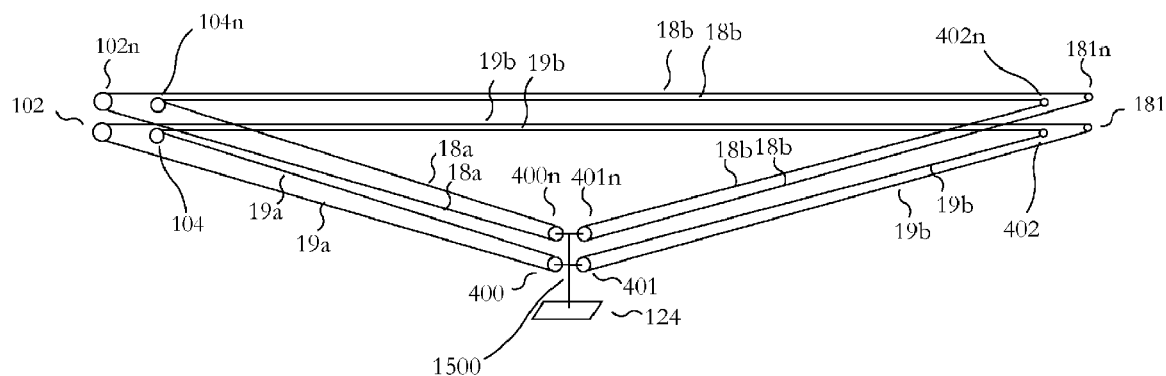
FIG. 15 shows a dependent nested embodiment of the invention.
Figure 15:
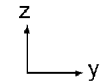
Figure 19:
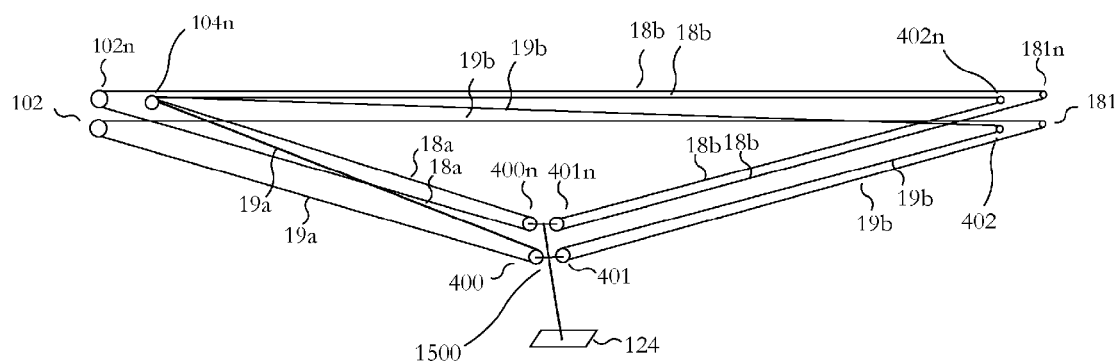
FIG. 19 shows a dependent nested embodiment of the invention utilizing one Z movement device and reeved with one line.
Figure 19:
Figures 19A, 19B, 19C, 19D:
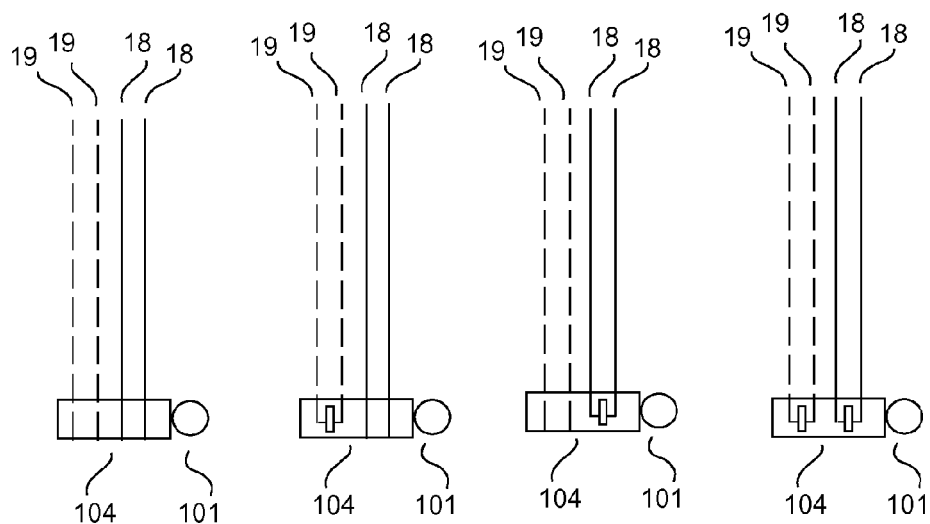
FIGS. 19A–G show one and two line realizations by selectively coupling line sides to one another and an exemplary Z movement device at which the realizations may be achieved.
Figure 19E:
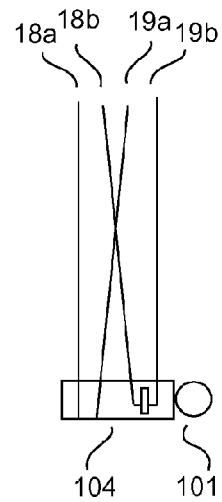
Figure 19F:
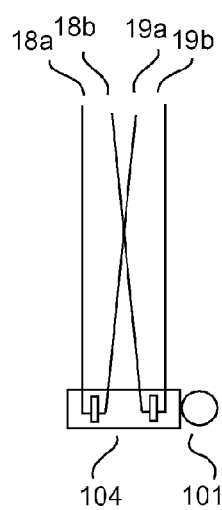
Figure 19G:
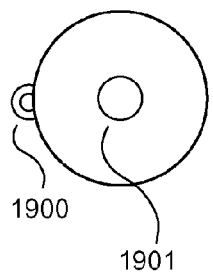

FIG. 15 is a perspective view of a nested dependent embodiment with a rod coupling each platform to yield a combined platform. By moving each Y movement device, rod 1500 may be positioned into any angle with respect to the vertical. By allowing the lower embodiment to lower the connection point, or upper embodiment to raise rod 800 while allowing rod 1500 to traverse vertically with respect to the lower embodiment (i.e., by sleeve mounting the lower embodiment on rod 1500), more or less lateral torque may be applied to a given scenario. Rod 1500 may be configured to rotate and may be configured to telescope. Rod 1500 may also comprise an articulated arm or boom. Y movement in the positive Y direction, to the right in the figure, is accomplished by rotating Y-axis motors 102 and 102n counter-clockwise in the diagram. As Y-axis motors 102 and 102n rotate counter-clockwise, line sides 18a and 19a moves into sheaves 400 and 400n and since line is not moving into Z movement devices 104 and 104n, platform 124 moves to the right. As this is occurring, line sides 18b and 19b are shortening and being drawn into Y movement devices 102 and 102n. As line side 19b leaves Y-axis bull wheel attached to Y-axis motor 102, it becomes designated line side 19a. Line sides 19a and 19b are designations for line side that is on one side of the Y movement device or the other. The corresponding designations are used for line sides 18a and 18b with respect to Y movement device 102n. Reversing the direction of Y-axis motor 102 pulls platform 124 in the negative Y-axis direction, to the left in the diagram. When the Y movement devices 102 and 102n are moved in different amounts rod 1500 is offset at an angle with respect to vertical. In addition, if rope slips in either Y movement device 102 or 102n, then use of stepper motors for these devices allows an offset to be applied to one or the other with the result being that rod 1500 is offset to the proper angle as was desired before the line slip without requiring re-reeving of the embodiment. Note again that any embodiment described herein may be utilized with any other embodiment described herein in order to nest a plurality of embodiments. By coupling Z movement devices 104 and 104n and Y movement devices 102 and 102n a fixed angle, for example vertical, may be set for rod 1500 that is maintained independent of Y or Z position. Note also that line sides 19a and 18a may be driven by Z movement device 104 and Z movement device 104 may be removed from the system. This embodiment is shown in FIG. 19 wherein line sides 19a and 18a may be coupled with one another therein yielding a nested embodiment that comprises only one line total. The coupled line may then be rolled into and out of Z movement device 104, for example a winch in order to raise sheaves 400n and 401n the same amount as sheaves 400 and 401 in the vertical axis. This embodiment results in a fixed displacement between sheaves 401 and 401n and sheaves 400 and 400n for example. The line side couplings at Z movement device 104 are shown in greater detail in FIGS. 19A–F. Depending on the coupling of line sides 18a, 18b, 19a and 19b two half loops result when the line sides are not coupled to one another as shown in FIG. 19A. One closed loop and one half loop result when one of the two ropes has its own two ends connected as shown in FIGS. 19B and 19C. Two closed loops are formed when both lines have both of their respective ends coupled to themselves as shown in FIG. 19D. One line embodiments are formed when one or both line sides of line 18 and 19 are coupled to one another. For example, when line side 18b is coupled to line side 19b for example and line sides 18a and 19a are not coupled to one another, a large half loop of line is formed in the system. When line sides 18a and 19a are coupled at their endpoints and line sides 18b and 19b are coupled at their endpoints to one another, one closed loop line is formed in the system. FIG. 19G shows eyelet 1900 configured to couple with line and rotate about axis 1901 when Z movement device 104 is implemented as a winch.

Figure 16:
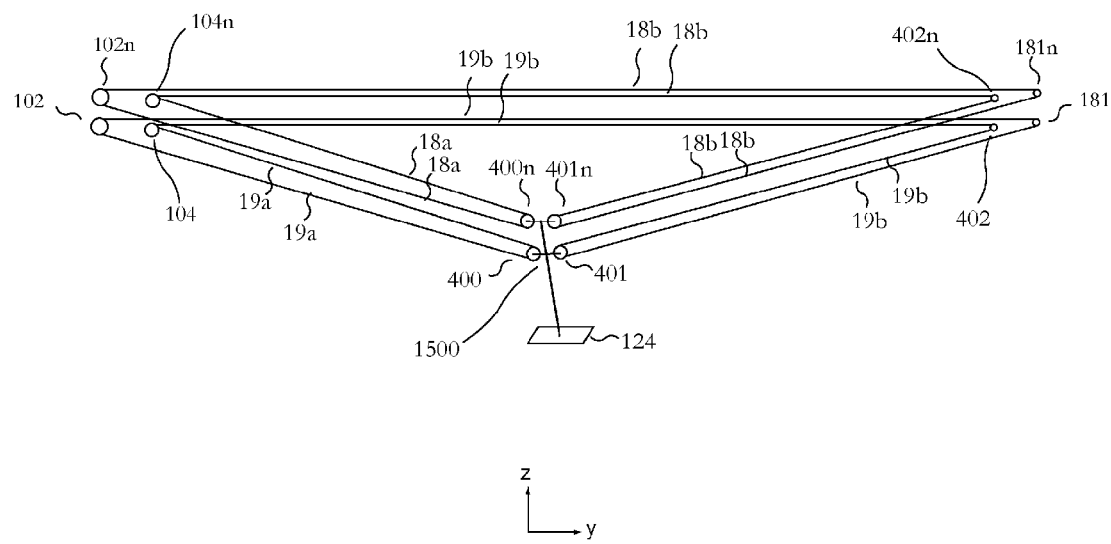
FIG. 16 shows a dependent nested embodiment of the invention with separate offset for the two shown nested embodiments resulting in an angular offset to rod 1500.

FIG. 16 shows a dependent nested embodiment of the invention with separate offset for the two shown nested embodiments resulting in an angular offset to rod 1500. By moving Y movement device 102n clockwise while not moving Y movement device 102, rod 1500 is angularly displaced with respect to the vertical axis. Also shown in FIG. 16 is a slight offset in the distance between sheaves 401 and 401n and sheaves 400 and 400n by either rotating Z movement device 104 clockwise or Z movement device 104n counterclockwise assuming a sleeve fitting on the lower mount of rod 1500. This non-equal displacement in the Z axis allows for more or less torque to be applied to rod 1500. In addition, rod 1500 is shown as telescoped downward in order to provide for further extension in the axis defined by rod 1500. Platform 124 may be passively or actively stabilized to remain level, or may be statically mounted meaning that platform 124 would lean and remain perpendicular to the axis defined by rod 1500 in another embodiment of the invention.

Figure 17:
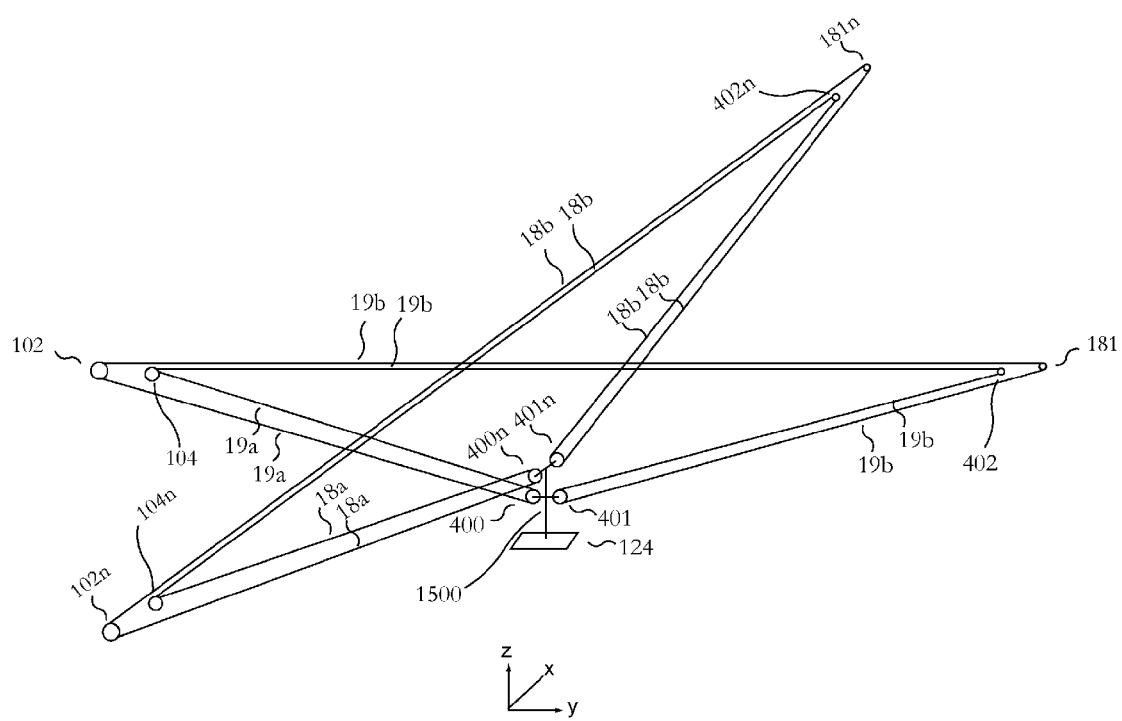
FIG. 17 shows a dependent nested embodiment comprising nested instances offset from one another yielding an embodiment capable of moving objects within three-dimensional space.

FIG. 17 shows a dependent nested embodiment comprising nested instances offset from one another yielding an embodiment capable of moving objects within three-dimensional space. Operation in the X axis is accomplished via the nested embodiment comprising Z movement device 104n and Y movement device 102n. Operation in the Y axis is accomplished via embodiment comprising Z movement device 104 and Y movement device 102. Although the sheaves 400 and 400n are shown with an offset in the vertical Z axis, this is not necessary but allows for angular displacement of rod 1500. For embodiments of the invention not requiring angular offsets of rod 1500, sheaves 400, 400n, 401 and 401n may be mounted at the same vertical offset from platform 124. In general operation of one axis is dependent upon another axis, however with computer control any platform movement over a coverage area is possible. Since nested embodiments utilize lines that may or may not be along the Y axis, they may be termed "movement" lines and the Y movement motor may be termed a "horizontal movement motor".

Figure 18:
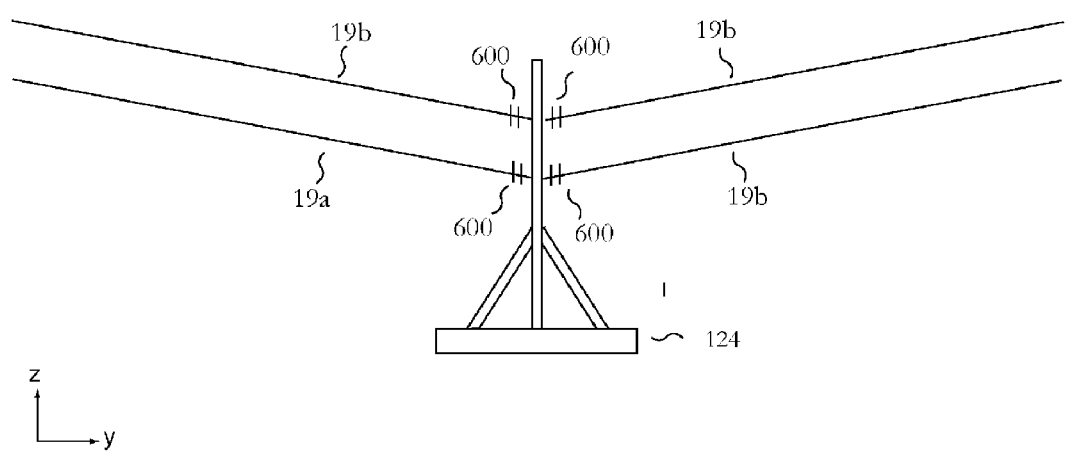
FIG. 18 shows a detailed view of an embodiment of the nested platform with respect to the embodiments shown in FIGS. 1, 2, 3 and 5.

Nested embodiments utilizing the reevings of FIGS. 1, 2, 3 and 5 may utilize the platform shown in FIG. 18. In this embodiment sheave 172 of FIG. 6 has been removed since line 19b traveling through sheave 172 may be configured to run above the supporting sheaves 171 and 173 as shown in FIG. 2. For example, in FIG. 2, sheave 172 may be eliminated and line sides 19b running in and out of sheave 172 may run directly between sheaves 171 and 173. Running line sides 19b through sheave 172 allows for half the load to be supported by sheave 172 meaning that a smaller line may be utilized in the system. Running line side 19b directly between sheaves 171 and 173 means that the entire weight of the platform is supported by line sides 19a and 19b in FIG. 2. In FIG. 18 since there are four attachment points 600 allowing for the support of the platform through the lines (here shown as a one line embodiment utilizing rope 19a and 19b), then line does not have to be twice as strong.

Platform 124 can have many different apparatus attached to it to perform a variety of functions including but not limited to buoyant elements, stabilization devices, gimbals, camera equipment, mining loaders, ship-to-ship loaders, logging devices, ski lift seats, gondolas, body sensing flight simulator suits for allowing a person to simulate flying, reduced gravity simulator suits, lifting harnesses, munitions depot bomb retrievers, digital video equipment for security checks in railroad yards or nuclear facilities, robotic agricultural harvest pickers for quickly picking and storing grapes or other produce or any other device that benefits from repeatable placement and motion in two dimensional space. In another embodiment, platform 124 comprises a witness camera mounted pointing down from the platform, providing a picture from the viewpoint of the platform.

Sheaves coupled with platform 124 may comprise generators that are used to feed a platform based power system that allows the platform to derive power and/or regenerate power through movement of the platform. Power may also be supplied by an external power line that may be festooned along a line such as 18a, 18b, 19a or 19b in order to drive components coupled with the platform.

While the invention herein disclosed has been described by means of specific embodiments and applications thereof, numerous modifications and variations could be made thereto by those skilled in the art without departing from the scope of the invention set forth in the claims.

What is claimed is:

1. A system comprising:
 a platform and two rope subsystems; wherein, each of said two rope subsystems including:
  two freely rotating sheaves each coupled to opposing sides of said platform wherein no sheave coupled with said platform is coupled with a brake;
  a YZ movement rope configured to move said platform;
  a Z movement device configured to move said YZ movement rope;
  a Y movement motor coupled with said YZ movement rope;
  a Z movement motor coupled with said Z movement device; and wherein,
  said YZ movement rope is a single rope that has two ends attached to said Z movement device.

2. The system of claim 1 further comprising a plurality of sheaves through which said YZ movement rope travels.

3. A method comprising:
 providing a platform;
 providing two rope subsystems;
 coupling said platform to said two rope subsystems, wherein, the step of providing each of said rope subsystems including:
 coupling a YZ movement rope with two freely rotating sheaves each coupled to opposing sides of the platform wherein no sheave coupled with said platform is coupled with a brake;
 coupling a Z movement device to said YZ movement rope;
 coupling said YZ movement rope to a Y movement motor;
 coupling said Z movement device to a Z movement motor; and wherein, said YZ movement rope is a single rope that has two ends attached to said Z movement device.

4. The method according to claim 3, further comprising: moving said platform in an angular offset with respect to a vertical axis.

5. A system comprising:
 a platform and two rope subsystems; wherein, each of said two rope subsystems including:
  means for coupling a YZ movement rope with two freely rotating sheaves each coupled to opposing sides of said platform wherein no sheave coupled with said platform is coupled with a brake;

means for coupling a Z movement device to said YZ movement rope;

means for coupling said YZ movement rope to a Y movement motor;

means for coupling said Z movement device to a Z movement motor;

said YZ movement rope being a single rope that has two ends attached to said Z movement device; and wherein, all of said means for coupling, said sheaves, said YZ movement rope, said Z movement device, said Z movement motor, and said Y movement motor form parts of said system.

6. The system according to claim 5, wherein, said rope subsystems are configured to move said platform in an angular offset with respect to a vertical axis.

* * * * *